Aug. 30, 1966    B. JORE ETAL    3,270,105
APPARATUS AND METHOD FOR MAKING A LEAK-DETECTING
ELECTRICAL CONDUCTOR
Filed May 14, 1965    2 Sheets-Sheet 1
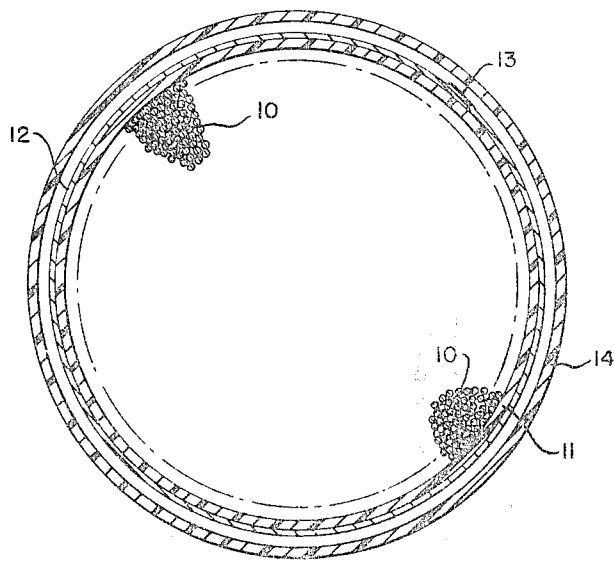
FIG. 1
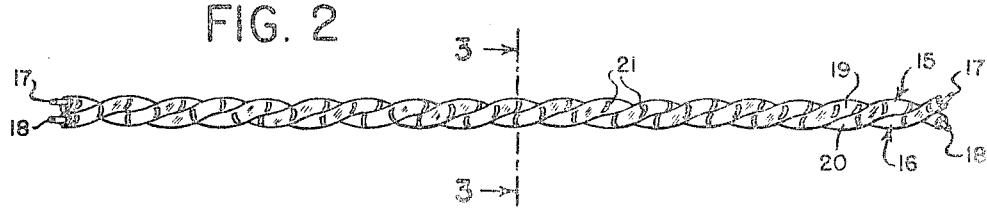
FIG. 2
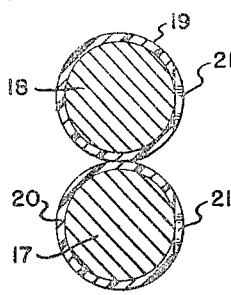
FIG. 3
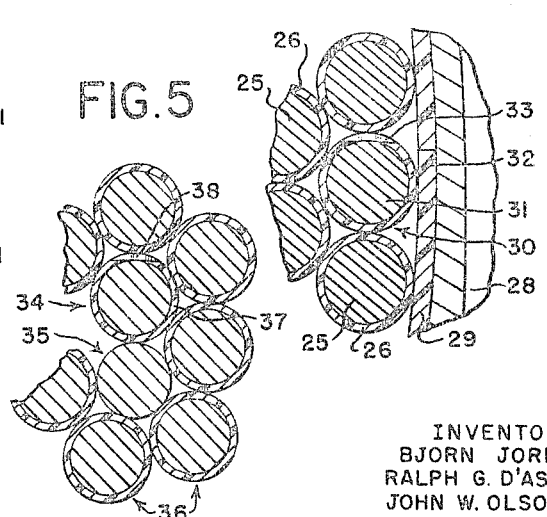
FIG. 5
FIG. 4
INVENTORS
BJORN JORE
RALPH G. D'ASCOLI
JOHN W. OLSON
BY
*Pennie, Edmonds, Morton, Taylor & Adams*
ATTORNEYS

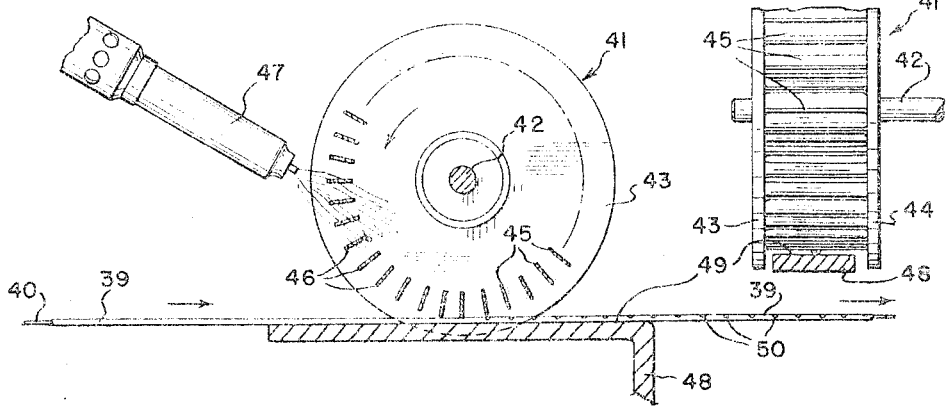
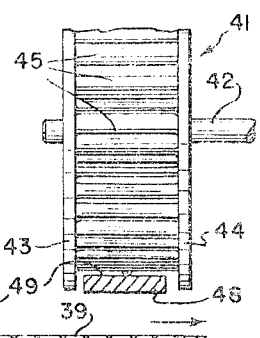
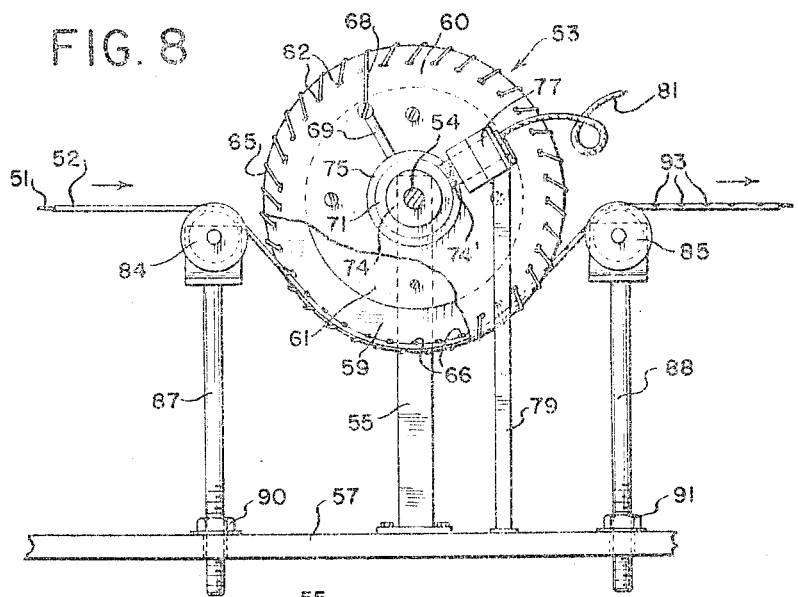
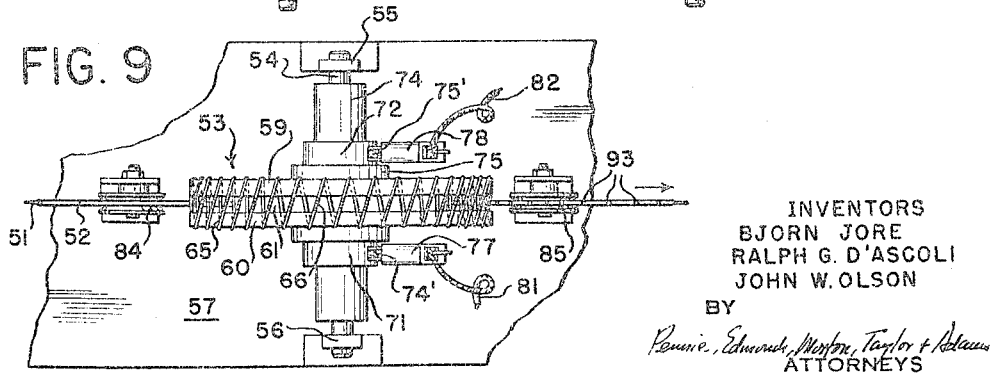

United States Patent Office 3,270,105
Patented August 30, 1966

3,270,105
APPARATUS AND METHOD FOR MAKING A LEAK-DETECTING ELECTRICAL CONDUCTOR
Bjorn Jore, Hastings on Hudson, Ralph G. D'Ascoli, Yonkers, and John W. Olson, Dobbs Ferry, N.Y., assignors to Anaconda Wire and Cable Company, New York, N.Y., a corporation of Delaware
Filed May 14, 1965, Ser. No. 455,932
9 Claims. (Cl. 264—139)

This invention relates to an apparatus for making a leak-detecting electrical conductor by which closely spaced openings may be formed along the length of a layer of synthetic thermoplastic dielectric material covering the conductor. The resultant conductor is particularly suitable for use in a telephone cable for locating leaks therein. This application is a continuation-in-part of Serial No. 237,779, filed October 12, 1962, which in turn is a division of the application, Serial No. 844,931, filed October 7, 1959, now Patent No. 3,098,116, issued July 16, 1963.

In the typical telephone cable, an outer protective jacket enclosures a multiplicity of conductor pairs which may each carry a separate telephone circuit. These conductors are usually individually insulated with a non-porous thermoplastic dielectric material such as polyethylene. It sometimes happens that the jacket in such a telephone cable develops a leak through which water gains access to the conductor pairs therewithin. The water can then cause a short circuit in one or more of the conductor pairs by seeping through one of the occasional small pinholes which are practically unavoidable in the conductor insulation. Even if the water does not directly short out one of the conductor pairs in this manner, it can disrupt service simply by enveloping a short length of one or more of the pairs and increasing its mutual capacitance to the point where the voice signal is lost.

It has been found, however, that with the use of the newer non-porous thermoplastic dielectric material as individual insulation on the conductor pairs even more serious problems are created when a leak occurs. The water often travels a considerable distance through the cable from the point of the leak before it encounters a defect in the non-porous insulation and causes a short circuit or sufficiently envelops one of the conductor pairs to critically attenuate its voice signal. As a result, when a disruption in service occurs from the wetting of conductor pairs insulated with these non-porous synthetic dielectric materials, it is very difficult to determine where the leak has occurred, since the water may have traveled for hundreds of feet through the cable from the point of leak. Also, when the leak is found, the extended length of the cable which is wetted must be replaced or reconditioned.

It is the purpose of this invention, therefore, to provide a telephone cable which includes line conductors insulated with a synthetic non-porous dielectric material and which also includes detecting means responsive to entry of water into the cable for locating leaks in the cable. The detecting means of the invention provides a separate detecting circuit which is insulated in a manner such that it conducts immediately upon being wetted with water from the leak, but not from the presence of mere humidity inside the jacket. Hence, the leak is definitely known to be closely adjacent the point where the water closed the detecting circuit and the search for it is greatly simplified. Also, only a short length of the telephone cable is wetted and must be removed or reconditioned as a result of the leak.

The detector means of the invention is adapted for use in a telephone cable having an outer protective jacket and a multiplicity of conductor pairs enclosed within and extending through the jacket. Each conductor of each pair is surrounded by an insulating layer of non-porous thermoplastic dielectric material. The detecting means comprises an electrically conductive element bared at least at closely spaced intervals throughout its entire length enclosed within and extending through the jacket. At least one detector conductor is enclosed within and extends through the cable closely adjacent this electrically conductive element. The detector conductor is surrounded by a layer of non-porous thermoplastic dielectric material normally insulating the detector conductor from the electrically conductive element. The insulating layer on the detector conductor is formed with small openings spaced along its entire length through which the surface of the detector conductor is exposed. Thus, when a voltage drop is impressed across the electrically conductive element and the detector conductor and water enters through a leak in the cable, the discontinuously insulated detector conductor is wetted and a circuit is closed between the electrically conductive element and the detector conductor.

The electrically conductive element may take different forms in the telephone cable of the invention. In one embodiment, a pair of discontinuously insulated detector conductors are enclosed within and extend closely adjacent one another throughout the cable, so that one of the detector conductors of the pair serves as the electrically conductive element. In another embodiment, an electrically conductive shield and at least one detector conductor adjacent thereto extends throughout the cable. Thus, in the second embodiment of the invention the shield serves as the above-mentioned electrically conductive element. Also, in another embodiment a bare conductor, adjacent a discontinuously insulated detector conductor, serves as the electrically conductive element.

In accordance with this invention, the leak-detecting electrical conductors are made by a method which comprises directing an insulated electrical conductor to a perforation station. The insulated conductor comprises a metallic wire and at least one layer of thermoplastic insulated covering thereon. The insulated conductor is pressed in the station by a plurality of closely-spaced heated elements having a temperature above the softening point of the thermoplastic covering and at a pressure sufficient to deform thermally the plastic covering to provide closely spaced openings along the insulated conductor and to expose the metallic conductor. The perforated conductor is then withdrawn from the station.

Advantageously, this method is carried out by an apparatus which comprises a rotatably mounted wheel having a multiplicity of heat-conductive cutting members disposed about its peripheral portion. These cutting members each have a radially projecting cutting edge formed thereon. Heating means are included for elevating the temperature of the cutting members above the softening temperature of the thermoplastic material. Also, means are provided for directing a moving length of the covered conductor into engagement with the circumference of the wheel forcibly against the cutting edges of the cutting members. Thus, as the covered conductor is directed against the cutting members, the wheel rotates and the heated cutting edges thereof consecutively displace portions of the thermoplastic material to form closely spaced openings therein exposing the conductor.

In one embodiment of this apparatus, the cutting members are blades radially disposed about the peripheral portion of the wheel, and the heating means is a torch which directs a flame against the cutting blades to elevate them to a temperature above the softening temperature of the thermoplastic material. In another embodiment of the apparatus, the cutting members are portions of an extended wire uniformly threaded back and forth through holes formed in the peripheral portions of a pair of spaced coaxial circular discs. This wire is threaded from the outer end of an electrically insulated hole in one disc across the edges of the disc and into the outer end of the next electrically insulated hole in the opposite disc, so that each loop of the wire includes a cutting portion between the discs. Also, the heating means in this second embodiment of the apparatus is an electrical circuit which passes current through the wire to heat it to a temperature above the softening temperature of the thermoplastic material.

Preferred embodiments of the new telephone cable and apparatus of the invention are described hereinbelow with reference to the accompanying drawings, wherein FIG. 1 is a section taken through a telephone cable of the type in which the new detector means is to be incorporated;

FIG. 2 is an enlarged view of a length of a twisted pair of the detector conductors of the invention;

FIG. 3 is a section taken along the line 3—3 of FIG. 2;

FIG. 4 is an enlarged fragmentary section of a shielded telephone cable showing one of the new detector conductors adjacent the shield;

FIG. 5 is an enlarged fragmentary section of a telephone cable in which a discontinuously insulated detector conductor is disposed adjacent a bare conductor;

FIG. 6 is an elevation partly in section of one embodiment of the new apparatus for forming closely spaced openings along the length of a layer of thermoplastic dielectric material covering an electrical conductor;

FIG. 7 is a fragmentary end view of the apparatus of FIG. 6;

FIG. 8 is an elevation partly in section of a second embodiment of the new apparatus; and FIG. 9 is a fragmentary plan view of the apparatus of FIG. 8.

Referring first to FIG. 1, a telephone cable is shown which includes an inner core assembly made up primarily of a multiplicity of conductor pairs 10, each of which may form a separate telephone circuit. Wrapped about the conductor pairs 10 is a suitable narrow non-porous protective tape 11. Surrounding the tape 11 throughout the length of the cable is an aluminum shield 12, which may be an extended thin aluminum strip applied longitudinally with its edges overlapping at 13. In relatively large diameter telephone cables, the aluminum shield 12 may be corrugated as shown. Surrounding the outside of the shield 12 is a continuous extruded protective jacket 14 of suitable moisture resistant material, such as polyethylene.

A thin normally continuous layer of synthetic polymeric material, such as polyethylene, covers each of the conductors of the pairs 10 and electrically insulates them from one another. For purposes of identification, these coverings are often of different colors and the conductors 10 are often wrapped in separate groups and sub-groups. As many as possible of the conductors 10 are usually included within the cable.

Occasional defects, such as pin-holes, in the insulation covering these many extended conductors 10 cannot be avoided, however, so that the jacket 14 is provided to prevent water from entering the cable and short circuiting the conductor pairs. But if a leak does occur in the jacket 14, and absent any form of leak-detecting means, the water which enters can work its way for hundreds of feet in either direction from the point of the leak before it encounters a defect in one of the conductor pairs 10 and causes a short circuit or otherwise effects a loss of the voice signal. It then becomes necessary to search carefully along those hundreds of feet of cable to find the leak and the entire wetted length of the cable must be removed, replaced or reconditioned.

These problems are obviated by the detector means of the invention, however, which in one embodiment is a pair of twisted detector conductors 15 and 16 as shown in FIG. 2. The detector conductors 15 and 16 are made up of copper wires 17 and 18 respectively which are surrounded by insulating layers 19 and 20 of a thermoplastic dielectric material such as polyethylene. Each of the detector conductors 15 and 16 has a multitude of small openings 21 formed in its respective layer of insulation 19 and 20. These openings are closely spaced along the entire length of the detector conductors and expose the wires 17 and 18 therewithin. As is shown in FIG. 3, the openings 21 are advantageously transversely displaced or removed portions of the layers of insulation 19 and 20, which can be formed with the apparatus of the invention described hereinbelow.

One or more of these twisted pairs of detector conductors 15 and 16 are enclosed within the cable along with all of the conductor pairs 10. The detector conductors 15 and 16 are substantially of the same size and shape, and are twisted in the same manner as the conductor pairs 10, but differ therefrom in that they are discontinuously insulated as described. The number of the detector conductors 15 and 16 incorporated into the cable depends primarily upon the size of the cable, since with larger telephone cables a greater number of detector conductors may be installed.

Under operating conditions, a voltage potential is constantly maintained across the detector conductors 15 and 16. Then, if a leak occurs in the jacket 14 of the cable and water enters along the conductors 10, the water cannot proceed too far within the cable before it encounters and wets a portion of one of the twisted pairs of detector conductors 15 and 16 and causes a current flow. In response to such current flow, an audible or visual alarm or other signaling device may be actuated to indicate that a leak has occurred somewhere along the cable. Then, by any of the conventional testing circuits, (such as the Murray Loop), the position of the short circuit along the length of the cable may be determined. Hence, it is only necessary to proceed to the point along the cable where the fault occurred and search the adjacent portions of the jacket 14 for the leak.

Turning now to FIG. 4, a portion of the telephone cable is shown which includes a multiplicity of conductor pairs 25 insulated by respective layers 26 of synthetic polymeric material, such as polyethylene. Surrounding the conductor pairs 25 throughout their length is a metallic shield 28 which may be a longitudinally applied aluminum strip, corrugated if necessary, as described in reference to FIG. 1. A narrow protective tape 29 may also be wrapped helically about the assembled conductor pairs 25 within the shield 28 as mentioned previously.

In this embodiment, only a single discontinuously insulated detector conductor 30 need be included adjacent the inside surface of the tape 29 and shield 28. The detector conductor 30 includes an inner copper wire 31 surrounded by a layer of insulation 32 which is formed with openings 33 spaced closely along its length. In operation, a voltage potential is always maintained between the wire 31 of the detector conductor 30 and the shield 28. Since the shield is normally at ground potential, the wire 31 may simply be connected to one pole of a battery. If a leak occurs in the cable, any water entering therethrough quickly wets the detector conductor 30 and the adjacent tape 29 and shield 28, and causes current to flow between the wire 31 and the shield 28. This, in turn, may actuate an alarm as described previously and the location of the circuit may be determined by one of the conventional testing methods. It is only necessary then to go to the calculated point of the fault and search there for a leak in the cable.

In the embodiment of the invention shown in FIG. 5, a pair of detector conductors 34 and 35 extend adjacent one another through surrounding conductor pairs 36, perhaps well within the interior of the cable. The detector conductor 34 is surrounded throughout its length by a layer of insulation 37 formed with closely spaced openings 38. The other detector conductor 35 is completely bare throughout its length. When water enters this form of the new telephone cable through a leak, it soon wets a portion of the detector conductors 34 and 35 and causes current to flow between them to actuate an alarm.

Referring now to FIGS. 6 and 7, one embodiment of the new apparatus is shown for forming closely spaced openings along the length of a layer 39 of thermoplastic dielectric polymeric material covering an electrical conductor 40. The apparatus includes a wheel 41 freely rotatably mounted about a shaft 42. Two spaced coaxial circular discs 43 and 44 fixed to the shaft 42 are included in the wheel 41. A multiplicity of uniformly spaced metal cutting blades 45 are radially disposed relative to the shaft 42 and extend between the opposed peripheral portions of the discs 43 and 44. The radially outwardly disposed edges of the blades 45 form blunt cutting edges 46 substantially parallel to and equidistant from the shaft 42.

Mounted upon any suitable adjacent frame is a gas heating torch 47 which is positioned relative to the wheel 41 to direct a flame against the cutting blades 45. The torch 47 is located so that upon counterclockwise rotation of the wheel 41, as seen in FIG. 6, the blades 45 are heated by the torch as they approach the lowermost point of travel.

Located adjacent the wheel 41 is a stationary guiding plate 48 having a flat horizontal upper surface 49 substantially tangentially arranged relative to the wheel 41. The surface 49 of the guiding plate 48 is spaced from the cutting edges 46 of the adjacent blades 45 a distance substantially equal to the diameter of the conductor 40 plus the thickness of the layer 39 of thermoplastic material covering the conductor.

In the operation of the apparatus of FIGS. 6 and 7, the torch 47 directs a flame against the cutting blades 45 to heat them to a temperature above the softening temperature of the layer 39 of thermoplastic material covering the conductor 40. A moving length of the covered conductor 40 is drawn over the surface 49 of the guiding plate 48 beneath the cutting edges 46 of the blades 45. Because of the close spacing between the cutting edges 46 and the surface 49, the covered conductor 40 is forced against the cutting edges 46 and the wheel 41 is caused to rotate. Thus, as the blades 45 rotate consecutively against the covered conductor 40, the cutting edges 46 transversely displace portions of the layer 39 of thermoplastic material to form closely spaced openings 50 exposing the conductor 40. If desired, the blades 46 may be extended in length and arranged between widely spaced discs 43 and 44 to permit several covered conductors to be continuously perforated at one time in the manner described.

In the embodiment of the new apparatus shown in FIGS. 8 and 9, a conductor 51 covered by a layer 52 of ahermoplastic material is also perforated to form a detector conductor. This embodiment of the apparatus includes a wheel 53 freely rotatably mounted about as shaft 54 which is positioned in bearings on a pair of standards 55 and 56 extending upwardly from a frame 57. The wheel 53 includes a pair of coaxial circular discs 59 and 60 of dielectric material secured to the shaft 54 and spaced apart by an interposed smaller disc 61. The discs 59 and 60 have formed about their respective peripheral portions a plurality of holes 62 which extend through and are circularly arranged at uniform intervals about the discs.

An extended wire 65 is uniformly threaded back and forth between the discs 59 and 60 through the holes 62 from the outer end of a hole in one disc across the peripheral edges of the pair of discs and into the outer end of the next hole in the opposite disc. Thus, each loop of the wire 65 includes a cutting portion 66 between the discs which is equidistant from the shaft 54 of the wheel 53. Depending upon whether the holes 62 are opposed to or offset from one another in the respective discs 59 and 60, the cutting portions 66 of the threaded wire will be either parallel or slightly skewed relative to the axis of the wheel 53. In any event, however, the cutting portions 66 can be considered to be at least substantially parallel to the axis of the wheel 53.

The respective opposite ends 68 (one of which is shown in FIG. 8) of the wire 65 are electrically connected by a conductive connector 69 to a pair of electrically conductive rings 71 and 72 mounted about and electrically insulated from the shaft 54 on opposite sides of the pair of discs 59 and 60. The rings 71 and 72 may be insulated by an inner spindle 74 and respective bushings 75, each of dielectric material, which are secured coaxially to the shaft 54.

In continuous sliding engagement with the respective rings 71 and 72 are two stationary electrically conductive carbon shoes 74' and 75' mounted in corresponding fixtures 77 and 78 on standards 79 extending from the frame 57. The shoes 74' and 75' are electrically connected by insulated conductors 81 and 82 respectively to a voltage source. Thus, current may be passed from the shoe 74' to the ring 71, and then through the wire 65 to the opposite ring 72 and shoe 75'. By regulating the current passed through this circuit, the wire 65 may be heated to various elevated temperatures.

Also incorporated in this embodiment of the apparatus are guiding means which include a pair of pulleys 84 and 85. These pulleys are freely rotatably mounted about separate axes parallel to the axis of the wheel 53 and are disposed in the plane of the wheel 53. The pulleys 84 and 85 are mounted on corresponding posts 87 and 88 extending through the frame 57 in threaded engagement therewith. Thus, the elevation of the pulleys 84 and 85 may be varied by adjusting the position of the posts 87 and 88 relative to the frame 57. The posts 87 and 88 can be locked in the desired position by respective lock nuts 90 and 91.

In the operation of this embodiment of the apparatus, current is passed through the above-described circuit to heat the wire 65 to a temperature above the softening temperature of the layer 52 of thermoplastic material covering the conductor 51. The covered conductor 51 is then passed over the pulleys 84 down and around the wheel 53 and out over the pulley 85, so that it passes over an arcuate portion of the wheel 53 and is forced against a succession of the cutting portions 66 of the wire 65. Hence, as the covered conductor 51 is directed through the apparatus in this manner, the wheel 53 rotates freely and the heated cutting portions 66 of the wire consecutively displace or remove portions of the layer 52 of thermoplastic material covering the conductor 51, thereby forming a series of closely and uniformly spaced transversely arranged openings 93 in the thermoplastic material. By adjusting the elevation of the pulleys 84 and 85 relative to the frame 57, the arcuate length of the covered conductor 51 forced against the heated cutting portions 66 of the wheel 53 may be varied to regulate the cutting action of the cutting portions 66.

In both the apparatus of FIGS. 6–7 and 8–9, the perforated covered conductor formed thereby provides a detector conductor for the telephone cable of the invention. By thermally displacing or removing a transverse portion of the thermoplastic insulation covering the conductor, it is assured that the openings formed thereby are uniform in size and spacing. Also, the openings expose a sufficient amount of the conductor therewithin to cause conduction when a pair of the perforated conductors are wetted, yet permit the conductor to remain insulated so long as they are not wetted.

The method and the specific embodiments of the apparatus described hereinabove show that the perforation is performed on a single insulated wire. It is understood that 2 or more wires twisted, paralleled individually or integrally connected or extruded can be perforated simultaneously. We find that it is also advantageous to twist a pair of wires before performing the perforation on the twisted pairs. This alternative procedure can be adapted in regular production runs of telephone cable where one or more twisted pairs of telephone cable are perforated before being jacketed.

We claim:

1. Apparatus for forming closely spaced openings along the length of a layer of thermoplastic dielectric material covering an electrical conductor comprising a rotatably mounted wheel, said wheel comprising a pair of spaced coaxial circular discs, an axial shaft extending through said discs, and rotatably mounted on a pair of bearings, a multiplicity of heat-conductive cutting members disposed about the peripheral portion of said wheel joining said discs, said cutting members each having a radially projecting cutting edge formed thereon, heating means for elevating the temperature of said cutting members above the softening temperature of said thermoplastic material, and means for directing a moving length of the covered conductor into engagement with the circumference of said wheel and forcibly against the cutting edges of said cutting members.

2. Apparatus for forming closely spaced openings along the length of a layer of thermoplastic dielectric material covering an electrical conductor comprising a rotatably mounted wheel, a multiplicity of heat-conductive cutting blades radially displosed about the peripheral portion of said wheel, said cutting blades each having a radially projecting cutting edge formed thereon, a stationary heating torch for directing a flame against said cutting blades to elevate them to a temperature above the softening temperature of said thermoplastic material, and means for directing a moving length of the covered conductor into engagement with the circumference of said wheel and forcibly against the cutting edges of said cutting blades.

3. Apparatus for forming closely spaced openings along the length of a layer of thermoplastic dielectric material covering an electrical conductor comprising a freely rotatable wheel, said wheel comprising two spaced coaxial circular discs, an axial shaft extending through said discs and rotatably mounted in bearings, and a multiplicity of heat-conductive cutting blades radially disposed between opposed peripheral portions of said discs, said cutting blades each having a radially projecting blunt cutting edge formed thereon equidistant from and substantially parallel to the axis of said wheel, a stationary heating torch for directing a flame against said cutting blades to elevate them to a temperature above the softening temperature of said thermoplastic material, and a stationary guiding plate disposed parallel to the axis of said rotatable wheel and spaced from the cutting edges of the adjacent blades a distance substantially equal to the diameter of said conductor plus the thickness of said layer of thermoplastic material.

4. Apparatus for forming closely spaced openings along the length of a layer of thermoplastic dielectric material covering an electrical conductor comprising a freely rotatable wheel, said wheel comprising a pair of spaced coaxial circular discs of dielectric material, an axial shaft extending through said discs and rotatably mounted on a pair of bearings, said disc having a plurality of circularly arranged holes formed therein through their opposed peripheral portions, an extended wire uniformly threaded back and forth between said discs through said holes from the outer end of a hole in one disc across the edges of the pair of discs and into the outer end of the next hole in the opposite disc, whereby each loop of said wire includes a cutting portion between said discs equidistant from and substantially parallel to the axis of said wheel about the periphery thereof, circuit means for passing current through said wire to heat it to a temperature above the softening temperature of said thermoplastic material, and means for directing a moving length of the covered conductor partially over said wheel and forcibly against the cutting portions of said wire.

5. Apparatus for forming closely spaced openings along the length of a layer of thermoplastic dielectric material covering an electrical conductor comprising a freely rotatable wheel, said wheel comprising a pair of spaced coaxial circular discs of dielectric material, an axial shaft extending through said discs and rotatably mounted on a pair of bearings, said discs having a plurality of pairs of circularly arranged holes formed therein through their respective peripheral portions, an extended wire uniformly threaded back and forth between said discs through said holes from the outer end of a hole in one disc across the edges of the pair of discs and into the outer end of the next hole in the opposite disc, whereby each loop of said wire includes a cutting portion between said discs equidistant from and substantially parallel to the axis of said wheel about the periphery thereof, a pair of electrically conductive rings mounted about and electrically insulated from said shaft on opposite sides of said pair of discs, said wire being electrically connected at its opposite ends to the respective rings on said shaft, a pair of stationary electrically conductive shoes in continuous sliding engagement with said pair of rings on said wheel, circuit means for passing current from said shoes into said rings and through said wire to elevate said wire to a temperature above the softening temperature of said thermoplastic material, and a pair of pulleys rotatably mounted in the plane of and about separate axes parallel to the axis of said wheel, said pulleys providing guiding means for directing the moving length of the covered conductor partially over said wheel and forcibly against the cutting portions of said wire, said pulleys being adjustably mounted to vary the arcuate length of the covered conductor forced against said cutting portions.

6. A method for making leak-detecting electrical conductors which comprises directing an insulated electrical conductor to a perforation station, said insulated conductor comprising a metallic wire and at least one layer of thermoplastic insulated covering thereon, pressing in said station a plurality of closely spaced heated elements having a temperature above the softening point of said thermoplastic covering against said insulated conductor at a pressure sufficient to deform thermally said plastic covering to provide closely spaced openings along the insulated conductor exposing the metallic conductor, and withdrawing the perforated conductor from said station.

7. A method for making leak-detecting electrical conductors which comprises directing an insulated electrical conductor to a perforation station, said insulated conductor comprising a metallic wire and at least one layer of thermoplastic insulated covering thereon, pressing in said station sequentially a plurality of closely spaced heated elements having a temperature above the softening point of said thermoplastic covering against said insulated conductor at a pressure sufficient to deform thermally said plastic covering while said conductor advances through said station to provide closely spaced openings along the insulated conductor exposing the metallic conductor, and withdrawing the perforated conductor from said station.

8. A method for making leak-detecting electrical conductors which comprises directing an insulated electrical conductor to a perforation station, said insulated conductor comprising a metallic wire and at least one layer of thermoplastic insulated covering thereon, pressing in said station sequentially a plurality of closely spaced cutting edges heated to a temperature above the softening point of said thermoplastic covering against said insulated conductor at a pressure sufficient to displace consecutively portions of said plastic covering while said conductor advances through said station to form closely spaced openings along the insulated conductor exposing the metallic conductor, and withdrawing the porforated conductor from said station.

9. A method for making leak-detecting electrical conductors which comprises directing an insulated electrical conductor to a perforation station, said insulated conductor comprising a metallic wire and at least one layer of thermoplastic insulated covering thereon, simultaneously advancing to said station a plurality of closely spaced cutting elements heated to a temperature above the softening point of said thermoplastic covering, engaging sequentially said cutting elements against said conductor in said station while said conductor passes therethrough displacing portions of said plastic covering along the insulated conductor to form closely spaced openings therein exposing the metallic conductor, and withdrawing the perforated conductor from said station.

References Cited by the Examiner
UNITED STATES PATENTS

| | | |
|---|---|---|
| 1,433,971 | 10/1922 | Roberts _____ 18—1 X |
| 2,255,718 | 9/1941 | Van Vorst _____ 18—1 X |
| 2,683,208 | 7/1954 | Andrews. |
| 2,711,737 | 6/1955 | Emery _____ 264—154 X |
| 3,160,687 | 12/1964 | Andrews _____ 264—154 X |

WILLIAM J. STEPHENSON, *Primary Examiner.*